United States Patent
Gunyakti et al.

(10) Patent No.: US 10,437,964 B2
(45) Date of Patent: Oct. 8, 2019

(54) PROGRAMMING INTERFACE FOR LICENSING

(75) Inventors: Caglar Gunyakti, Sammamish, WA (US); Wen-Pin Scott Hsu, Redmond, WA (US); Ning Zhang, Sammamish, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 967 days.

(21) Appl. No.: 10/692,868

(22) Filed: Oct. 24, 2003

(65) Prior Publication Data

US 2005/0091168 A1    Apr. 28, 2005

(51) Int. Cl.
*G06F 21/10* (2013.01)

(52) U.S. Cl.
CPC .................... *G06F 21/10* (2013.01)

(58) Field of Classification Search
CPC ... G06F 21/20; G06F 21/10; G06F 2221/0742
USPC ........................................................... 705/59
See application file for complete search history.

(56) References Cited

U.S. PATENT DOCUMENTS

| | | | |
|---|---|---|---|
| 5,023,907 A | | 6/1991 | Johnson et al. |
| 5,155,806 A | | 10/1992 | Hoeber et al. |
| 5,204,897 A | * | 4/1993 | Wyman .................. 710/200 |
| 5,375,206 A | * | 12/1994 | Hunter et al. ........... 717/176 |
| 5,377,354 A | | 12/1994 | Scannell et al. |
| 5,500,936 A | | 3/1996 | Allen et al. |
| 5,519,606 A | | 5/1996 | Frid-Nielsen et al. |
| 5,559,944 A | | 9/1996 | Ono |
| 5,563,946 A | * | 10/1996 | Cooper et al. ........... 705/56 |
| 5,570,109 A | | 10/1996 | Jenson |
| 5,588,107 A | | 12/1996 | Bowden et al. |
| 5,596,694 A | | 1/1997 | Capps |
| 5,625,783 A | | 4/1997 | Ezekiel et al. |
| 5,629,980 A | * | 5/1997 | Stefik et al. ............. 705/54 |

(Continued)

FOREIGN PATENT DOCUMENTS

| | | |
|---|---|---|
| CN | 1207530 A | 2/1999 |
| EP | 0910007 A2 | 4/1999 |

(Continued)

OTHER PUBLICATIONS

MSDN—License Service Application Programming Interface, API Specification v1.02, Microsoft, Jan. 28, 1993.*

(Continued)

*Primary Examiner* — Alexis M Casey
(74) *Attorney, Agent, or Firm* — Davin Chin; Chin IP, PLLC

(57) ABSTRACT

A software licensing Application Programming Interface (API) that allows software products to use the license management functionality of a common service. A license specifies rights in a software product. The software product calls a consume method on the API in order to consume a right. If the right exists, the service binds the right to the license in which the right is found. The software product enforces the terms of the license by granting, or denying, access to some or all features depending on whether a valid instance of the right is found. Arbitrary data can be associated with a right. The API includes a method to retrieve data from a right that has been previously bound by the consume method.

16 Claims, 5 Drawing Sheets

(56) References Cited

U.S. PATENT DOCUMENTS

| | | | |
|---|---|---|---|
| 5,634,100 A | 5/1997 | Capps | |
| 5,634,128 A | 5/1997 | Messina | |
| 5,638,504 A | 6/1997 | Scott et al. | |
| 5,638,513 A * | 6/1997 | Ananda | G06F 21/125 705/55 |
| 5,659,693 A | 8/1997 | Hansen et al. | |
| 5,664,127 A | 9/1997 | Anderson et al. | |
| 5,664,208 A | 9/1997 | Pavley et al. | |
| 5,671,412 A * | 9/1997 | Christiano | |
| 5,721,847 A | 2/1998 | Johnson | |
| 5,734,915 A | 3/1998 | Roewer | |
| 5,760,768 A | 6/1998 | Gram | |
| 5,760,773 A | 6/1998 | Berman et al. | |
| 5,761,646 A | 6/1998 | Frid-Nielsen et al. | |
| 5,778,402 A | 7/1998 | Gipson | |
| 5,778,404 A | 7/1998 | Capps et al. | |
| 5,805,167 A | 9/1998 | van Cruyningen | |
| 5,812,132 A | 9/1998 | Goldstein | |
| 5,821,936 A | 10/1998 | Shaffer et al. | |
| 5,828,376 A | 10/1998 | Solimene et al. | |
| 5,838,321 A | 11/1998 | Wolf | |
| 5,842,009 A | 11/1998 | Borovoy et al. | |
| 5,844,558 A | 12/1998 | Kumar et al. | |
| 5,844,572 A | 12/1998 | Schott | |
| 5,855,006 A | 12/1998 | Huemoeller et al. | |
| 5,885,006 A | 3/1999 | Sheedy | |
| 5,893,125 A | 4/1999 | Shostak | |
| 5,898,436 A | 4/1999 | Stewart et al. | |
| 5,899,979 A | 5/1999 | Miller et al. | |
| 5,905,863 A | 5/1999 | Knowles et al. | |
| 5,926,806 A | 7/1999 | Marshall et al. | |
| 5,936,625 A | 8/1999 | Kahl et al. | |
| 5,940,078 A | 8/1999 | Nagarajayya et al. | |
| 5,940,847 A | 8/1999 | Fein et al. | |
| 5,943,051 A | 8/1999 | Onda et al. | |
| 5,960,406 A | 9/1999 | Rasansky et al. | |
| 5,970,466 A | 10/1999 | Detjen et al. | |
| 5,999,731 A | 12/1999 | Yellin et al. | |
| 5,999,938 A | 12/1999 | Bliss et al. | |
| 6,008,806 A | 12/1999 | Nakajima et al. | |
| 6,012,075 A | 1/2000 | Fein et al. | |
| 6,018,343 A | 1/2000 | Wang et al. | |
| 6,034,683 A | 3/2000 | Mansour et al. | |
| 6,047,242 A * | 4/2000 | Benson | 702/35 |
| 6,067,087 A | 5/2000 | Krauss et al. | |
| 6,072,492 A | 6/2000 | Schagen et al. | |
| 6,085,206 A | 7/2000 | Domini et al. | |
| 6,101,480 A | 8/2000 | Conmy et al. | |
| 6,115,777 A * | 9/2000 | Zahir et al. | 710/260 |
| 6,133,915 A | 10/2000 | Arcuri et al. | |
| 6,166,738 A | 12/2000 | Robertson et al. | |
| 6,175,363 B1 | 1/2001 | Williams et al. | |
| 6,188,403 B1 | 2/2001 | Sacerdoti et al. | |
| 6,189,146 B1 | 2/2001 | Misra et al. | 717/11 |
| 6,192,381 B1 | 2/2001 | Stiegemeier et al. | |
| 6,211,879 B1 | 4/2001 | Soohoo | |
| 6,216,122 B1 | 4/2001 | Elson | |
| 6,219,670 B1 | 4/2001 | Mocek et al. | |
| 6,222,540 B1 | 4/2001 | Sacerdoti | |
| 6,226,747 B1 | 5/2001 | Larsson et al. | 713/200 |
| 6,232,971 B1 | 5/2001 | Haynes | |
| 6,236,396 B1 | 5/2001 | Jenson et al. | |
| 6,256,628 B1 | 7/2001 | Dobson et al. | |
| 6,260,141 B1 | 7/2001 | Park | 713/155 |
| 6,278,450 B1 | 8/2001 | Arcuri et al. | |
| 6,289,317 B1 | 9/2001 | Peterson | |
| 6,289,502 B1 | 9/2001 | Garland et al. | |
| 6,289,505 B1 | 9/2001 | Goebel | |
| 6,301,704 B1 | 10/2001 | Chow et al. | |
| 6,305,012 B1 | 10/2001 | Beadle et al. | |
| 6,307,544 B1 | 10/2001 | Harding | |
| 6,308,317 B1 | 10/2001 | Wilkinson et al. | |
| 6,308,322 B1 | 10/2001 | Serocki et al. | |
| 6,323,883 B1 | 11/2001 | Minoura et al. | |
| 6,324,686 B1 | 11/2001 | Komatsu et al. | |
| 6,327,665 B1 | 12/2001 | Osanai | |
| 6,353,451 B1 | 3/2002 | Teibel et al. | |
| 6,359,634 B1 | 3/2002 | Cragun et al. | |
| 6,373,507 B1 | 4/2002 | Camara et al. | |
| 6,384,849 B1 | 5/2002 | Morcos et al. | |
| 6,385,596 B1 * | 5/2002 | Wiser et al. | 705/51 |
| 6,405,216 B1 | 6/2002 | Minnaert et al. | |
| 6,424,829 B1 | 7/2002 | Kraft | |
| 6,429,882 B1 | 8/2002 | Abdelnur et al. | |
| 6,433,801 B1 | 8/2002 | Moon et al. | |
| 6,456,304 B1 | 9/2002 | Angiulo et al. | |
| 6,459,441 B1 | 10/2002 | Perroux et al. | |
| 6,466,236 B1 | 10/2002 | Pivowar et al. | |
| 6,469,722 B1 | 10/2002 | Kinoe et al. | |
| 6,480,865 B1 | 11/2002 | Lee et al. | |
| 6,493,006 B1 | 12/2002 | Gourdol et al. | |
| 6,493,731 B1 | 12/2002 | Jones et al. | |
| 6,546,417 B1 | 4/2003 | Baker | |
| 6,570,596 B2 | 5/2003 | Frederiksen | |
| 6,578,192 B1 | 6/2003 | Boehme et al. | |
| 6,583,798 B1 | 6/2003 | Hoek et al. | |
| 6,587,881 B1 * | 7/2003 | Agarwal | G06F 9/505 709/203 |
| 6,618,732 B1 | 9/2003 | White et al. | |
| 6,621,504 B1 | 9/2003 | Nadas et al. | |
| 6,621,508 B1 | 9/2003 | Shiraishi et al. | |
| 6,635,089 B1 | 10/2003 | Burkett et al. | |
| 6,664,983 B2 | 12/2003 | Ludolph | |
| 6,680,749 B1 | 1/2004 | Anderson et al. | |
| 6,686,938 B1 | 2/2004 | Jobs et al. | |
| 6,691,281 B1 | 2/2004 | Sorge et al. | |
| 6,697,948 B1 * | 2/2004 | Rabin et al. | 726/30 |
| 6,708,205 B2 | 3/2004 | Sheldon et al. | |
| 6,727,919 B1 | 4/2004 | Reder et al. | |
| 6,732,330 B1 | 5/2004 | Claussen et al. | |
| 6,734,880 B2 | 5/2004 | Chang et al. | |
| 6,750,890 B1 | 6/2004 | Sugimoto | |
| 6,785,868 B1 | 8/2004 | Raff | |
| 6,825,859 B1 | 11/2004 | Severenuk et al. | |
| 6,826,729 B1 | 11/2004 | Giesen et al. | |
| 6,850,255 B2 | 2/2005 | Muschetto | |
| 6,871,195 B2 | 3/2005 | Ryan et al. | |
| 6,882,354 B1 | 4/2005 | Nielsen | |
| 6,904,449 B1 | 6/2005 | Quinones | |
| 6,906,717 B2 | 6/2005 | Couckuyt et al. | |
| 6,915,492 B2 | 7/2005 | Kurtenbach et al. | |
| 6,924,797 B1 | 8/2005 | MacPhail | |
| 6,964,025 B2 | 11/2005 | Angiulo et al. | |
| 6,983,889 B2 | 1/2006 | Alles | |
| 6,988,241 B1 | 1/2006 | Guttman et al. | |
| 6,990,637 B2 | 1/2006 | Anthony et al. | |
| 7,027,463 B2 | 4/2006 | Mathew et al. | |
| 7,032,210 B2 | 4/2006 | Alloing et al. | |
| 7,039,596 B1 | 5/2006 | Lu | |
| 7,046,848 B1 | 5/2006 | Olcott | |
| 7,107,544 B1 | 9/2006 | Luke | |
| 7,110,936 B2 | 9/2006 | Hiew et al. | |
| 7,111,238 B1 | 9/2006 | Kuppusamy et al. | |
| 7,152,207 B1 | 12/2006 | Underwood et al. | |
| 7,188,073 B1 | 3/2007 | Tam et al. | |
| 7,212,208 B2 | 5/2007 | Khozai | |
| 7,216,301 B2 | 5/2007 | Moehrle | |
| 7,249,325 B1 | 7/2007 | Donaldson | |
| 7,325,204 B2 | 1/2008 | Rogers | |
| 7,328,409 B2 | 2/2008 | Awada et al. | |
| 7,337,185 B2 | 2/2008 | Ellis et al. | |
| 7,346,705 B2 | 3/2008 | Hullot et al. | |
| 7,346,769 B2 | 3/2008 | Forlenza et al. | |
| 7,360,174 B2 | 4/2008 | Grossman et al. | |
| 7,386,535 B1 | 6/2008 | Kalucha et al. | |
| 7,392,249 B1 | 6/2008 | Harris et al. | |
| 7,461,249 B1 * | 12/2008 | Pearson et al. | 713/156 |
| 7,469,385 B2 | 12/2008 | Harper et al. | |
| 7,484,213 B2 | 1/2009 | Mathew et al. | |
| 7,505,954 B2 | 3/2009 | Heidloff et al. | |
| 7,530,029 B2 | 5/2009 | Satterfield et al. | |
| 7,567,964 B2 | 7/2009 | Brice et al. | |
| 7,627,561 B2 | 12/2009 | Pell et al. | |
| 7,739,259 B2 | 6/2010 | Hartwell et al. | |

(56) References Cited

U.S. PATENT DOCUMENTS

| | | |
|---|---|---|
| 8,027,925 B1* | 9/2011 | Garst et al. ............... 705/59 |
| 2002/0007380 A1 | 1/2002 | Bauchot et al. |
| 2002/0037754 A1 | 3/2002 | Hama et al. |
| 2002/0052721 A1 | 5/2002 | Ruff et al. |
| 2002/0070977 A1 | 6/2002 | Morcos et al. |
| 2002/0075330 A1 | 6/2002 | Rosenzweig et al. |
| 2002/0078143 A1 | 6/2002 | De boor et al. |
| 2002/0091739 A1 | 7/2002 | Ferlitsch et al. |
| 2002/0122071 A1 | 9/2002 | Camara et al. |
| 2002/0133557 A1 | 9/2002 | Winarski |
| 2002/0135621 A1 | 9/2002 | Angiulo et al. |
| 2002/0140731 A1 | 10/2002 | Subramaniam et al. |
| 2002/0140740 A1 | 10/2002 | Chen |
| 2002/0149623 A1 | 10/2002 | West et al. |
| 2002/0149629 A1 | 10/2002 | Craycroft et al. |
| 2002/0154178 A1 | 10/2002 | Barnett et al. |
| 2002/0161718 A1* | 10/2002 | Coley et al. ............... 705/59 |
| 2002/0163538 A1 | 11/2002 | Shteyn |
| 2002/0175955 A1 | 11/2002 | Gourdol et al. |
| 2002/0196293 A1 | 12/2002 | Suppan et al. |
| 2003/0011638 A1 | 1/2003 | Chung |
| 2003/0011639 A1 | 1/2003 | Webb |
| 2003/0014490 A1 | 1/2003 | Bates et al. |
| 2003/0022700 A1 | 1/2003 | Wang |
| 2003/0035917 A1 | 2/2003 | Hyman |
| 2003/0038832 A1 | 2/2003 | Sobol |
| 2003/0043211 A1 | 3/2003 | Kremer et al. |
| 2003/0066025 A1 | 4/2003 | Garner et al. |
| 2003/0070143 A1 | 4/2003 | Maslov |
| 2003/0076957 A1* | 4/2003 | Asokan et al. ............ 380/270 |
| 2003/0084286 A1* | 5/2003 | Bader ................ G06F 21/121 713/165 |
| 2003/0088516 A1* | 5/2003 | Remer et al. ............... 705/59 |
| 2003/0093490 A1 | 5/2003 | Yamamoto et al. |
| 2003/0097361 A1 | 5/2003 | Huang et al. |
| 2003/0098891 A1 | 5/2003 | Molander |
| 2003/0110191 A1 | 6/2003 | Handsaker et al. |
| 2003/0112278 A1 | 6/2003 | Driskell |
| 2003/0140009 A1 | 7/2003 | Namba et al. |
| 2003/0163455 A1 | 8/2003 | Dettinger et al. |
| 2003/0167310 A1 | 9/2003 | Moody et al. |
| 2003/0169284 A1 | 9/2003 | Dettinger et al. |
| 2003/0195937 A1 | 10/2003 | Kircher et al. |
| 2003/0206646 A1 | 11/2003 | Brackett |
| 2003/0218611 A1 | 11/2003 | Ben-tovim et al. |
| 2003/0226106 A1 | 12/2003 | Mckellar et al. |
| 2003/0227487 A1 | 12/2003 | Hugh |
| 2003/0233419 A1 | 12/2003 | Beringer |
| 2004/0003351 A1 | 1/2004 | Sommerer et al. |
| 2004/0012633 A1 | 1/2004 | Helt |
| 2004/0056894 A1 | 3/2004 | Zaika et al. |
| 2004/0090315 A1 | 5/2004 | Mackjust et al. |
| 2004/0100504 A1 | 5/2004 | Sommer |
| 2004/0100505 A1 | 5/2004 | Cazier |
| 2004/0107197 A1 | 6/2004 | Shen et al. |
| 2004/0109025 A1 | 6/2004 | Hullot et al. |
| 2004/0109033 A1 | 6/2004 | Vienneau et al. |
| 2004/0117451 A1 | 6/2004 | Chung |
| 2004/0119760 A1 | 6/2004 | Grossman et al. |
| 2004/0128275 A1 | 7/2004 | Moehrle |
| 2004/0133854 A1 | 7/2004 | Black |
| 2004/0142720 A1 | 7/2004 | Smethers |
| 2004/0164983 A1 | 8/2004 | Khozai |
| 2004/0168153 A1 | 8/2004 | Marvin |
| 2004/0186775 A1 | 9/2004 | Margiloff et al. |
| 2004/0189694 A1 | 9/2004 | Kurtz et al. |
| 2004/0221234 A1 | 11/2004 | Imai |
| 2004/0230508 A1 | 11/2004 | Minnis et al. |
| 2004/0230906 A1 | 11/2004 | Pik et al. |
| 2004/0239700 A1 | 12/2004 | Baschy |
| 2004/0243938 A1 | 12/2004 | Weise et al. |
| 2004/0268231 A1 | 12/2004 | Tunning |
| 2005/0004990 A1 | 1/2005 | Durazo et al. |
| 2005/0005249 A1 | 1/2005 | Hill et al. |
| 2005/0010871 A1 | 1/2005 | Ruthfield et al. |
| 2005/0021504 A1 | 1/2005 | Atchison |
| 2005/0022116 A1 | 1/2005 | Bowman et al. |
| 2005/0039142 A1 | 2/2005 | Jalon et al. |
| 2005/0043015 A1 | 2/2005 | Muramatsu |
| 2005/0044500 A1 | 2/2005 | Orimoto et al. |
| 2005/0050315 A1* | 3/2005 | Burkhardt ............ G06F 21/123 713/150 |
| 2005/0057584 A1 | 3/2005 | Gruen et al. |
| 2005/0086135 A1 | 4/2005 | Lu |
| 2005/0117179 A1 | 6/2005 | Ito et al. |
| 2005/0138576 A1 | 6/2005 | Baumert et al. |
| 2005/0144241 A1 | 6/2005 | Stata et al. |
| 2005/0172262 A1 | 8/2005 | Lalwani |
| 2005/0183008 A1 | 8/2005 | Crider et al. |
| 2005/0216863 A1 | 9/2005 | Schumacher et al. |
| 2005/0223329 A1 | 10/2005 | Schwartz et al. |
| 2005/0256867 A1 | 11/2005 | Walther et al. |
| 2005/0278656 A1 | 12/2005 | Goldthwaite et al. |
| 2005/0289156 A1 | 12/2005 | Maryka et al. |
| 2006/0020962 A1 | 1/2006 | Stark et al. |
| 2006/0036580 A1 | 2/2006 | Stata et al. |
| 2006/0036945 A1 | 2/2006 | Radtke et al. |
| 2006/0036965 A1 | 2/2006 | Harris et al. |
| 2006/0041545 A1 | 2/2006 | Heidloff et al. |
| 2006/0047644 A1 | 3/2006 | Bocking et al. |
| 2006/0080303 A1 | 4/2006 | Sargent et al. |
| 2006/0095865 A1 | 5/2006 | Rostom |
| 2006/0101051 A1 | 5/2006 | Carr et al. |
| 2006/0101350 A1 | 5/2006 | Scott |
| 2006/0111931 A1 | 5/2006 | Johnson et al. |
| 2006/0117249 A1 | 6/2006 | Hu et al. |
| 2006/0129937 A1 | 6/2006 | Shafron |
| 2006/0173824 A1 | 8/2006 | Bensky et al. |
| 2006/0218500 A1 | 9/2006 | Sauve et al. |
| 2006/0242557 A1 | 10/2006 | Nortis, III |
| 2006/0242575 A1 | 10/2006 | Winser |
| 2006/0294452 A1 | 12/2006 | Matsumoto |
| 2007/0050401 A1 | 3/2007 | Young et al. |
| 2007/0061306 A1 | 3/2007 | Pell et al. |
| 2007/0061307 A1 | 3/2007 | Hartwell et al. |
| 2007/0061308 A1 | 3/2007 | Hartwell et al. |
| 2007/0106951 A1 | 5/2007 | Mccormack et al. |
| 2007/0143671 A1 | 6/2007 | Paterson et al. |
| 2007/0185826 A1 | 8/2007 | Brice et al. |
| 2007/0240057 A1 | 10/2007 | Satterfield et al. |
| 2007/0260996 A1 | 11/2007 | Jakobson |
| 2007/0279417 A1 | 12/2007 | Garg et al. |
| 2007/0300168 A1 | 12/2007 | Bosma et al. |
| 2008/0034304 A1 | 2/2008 | Feuerbacher et al. |
| 2008/0040682 A1 | 2/2008 | Sorenson et al. |
| 2008/0052670 A1 | 2/2008 | Espinosa et al. |
| 2008/0077571 A1 | 3/2008 | Harris et al. |
| 2008/0178110 A1 | 7/2008 | Hill et al. |
| 2009/0007003 A1 | 1/2009 | Dukhon et al. |
| 2009/0083656 A1 | 3/2009 | Dukhon et al. |
| 2009/0100009 A1 | 4/2009 | Karp |
| 2009/0217192 A1 | 8/2009 | Dean et al. |
| 2009/0222763 A1 | 9/2009 | Dukhon et al. |

FOREIGN PATENT DOCUMENTS

| | | |
|---|---|---|
| EP | 1223503 A2 | 7/2002 |
| EP | 1 243 998 A1 | 9/2002 |
| EP | 0 715 247 B1 | 3/2003 |
| EP | 1376337 A1 | 1/2004 |
| EP | 1526427 A3 | 7/2005 |
| EP | 1672518 A2 | 6/2006 |
| EP | 1835434 A1 | 9/2007 |
| GB | 2391148 A | 1/2004 |
| JP | 5274275 A | 10/1993 |
| JP | 2002-358136 A | 12/2002 |
| WO | WO 92/20021 | 11/1992 |
| WO | WO 92/20022 | 11/1992 |
| WO | 9517732 A1 | 6/1995 |
| WO | 9904353 A1 | 1/1999 |
| WO | 9927495 A1 | 6/1999 |
| WO | WO 01/77795 A2 | 10/2001 |

(56) References Cited

FOREIGN PATENT DOCUMENTS

WO    02091162 A2    11/2002
WO    03098500 A1    11/2003

OTHER PUBLICATIONS

Agha, G.A. et al., "Modular Heterogeneous System Development: A Critical Analysis of Java", *Heterogeneous Computing Workshop*, 1998, 144-155, XP 010274892.
Technical Standard, Systems Management: Software License Use Management (XSLM), *The Open Group*, Mar. 1999, 1-23, 41-70, XP-002326441.
Aura, T. et al., "Software License Management with Smart Cards", *Proceedings of the USENIX Workshop on Smartcard Technology*, 1999, 75-85.
Grantham, I., "Centralize Software Monitoring with LicenseTrack 3.4", *UNIX Review*, 1996, 14(7), 45-46, 48.
Robert J. Oberg, Petr Thorsteinsson, Dan L.Wyatt: "Application Development Usin Visual Basic and .Net" [Online] Jun. 24, 2002 (Jun. 24, 2002), Prentice Hall Retrieved from the Internet: URL:http://proquest.safaribooksonline.com> [retrieved on Jun. 27, 2007] Part.4 : Fundamentals of the .Net framework Chapter 10 :.NET framework Classes Asynchronous Programming.
Craig Tunstall, Gwyn Cole: "Developing WMI Solutions: A Guide to Windows Management Instrumentation" Nov. 12, 2002 (Nov. 12, 2002), Addison Wesley Professional Retrieved from the Internet: URL:http://proquest.safaribooksonline.com> [retrieved on Jun. 27, 2007] Chapter 7. Developing Management Applications Making Asynchronous calls.
Norwegian Patent Application No. 20044099: Norwegian Search Report, dated Jan. 29, 2011, 2 pages.
Taiwan Invention Patent Application No. 093126908: Taiwan Search Report, dated Jan. 5, 2011, 1 page.
Office Action Received for Canadian Patent Application No. 2,482,182, dated Jun. 27, 2014, 4 Pages.
India Patent Application No. 1921/DEL/2004; Hearing Notice; dated Apr. 18, 2017; 2 pages.
"Office Action Issued in Brazilian Patent Application No. PI0404376-6", dated Mar. 6, 2017, 7 Pages.
"Office Action Issued in Korean Patent Application No. 10-2004-70500", dated May 31, 2012, 2 Pages.
"Final Office Action Issued in U.S. Appl. No. 11/136,800", dated Jul. 9, 2008, 21 Pages.
Boyce, Jim, "Microsoft Outlook Inside Out", Published by Microsoft Press, Jan. 2001, pp. 133, 134, 721-728.
"Final Office Action Issued in U.S. Appl. No. 11/151,686", dated Jul. 24, 2008, 17 Pages.
"Final Office Action Issued in U.S. Appl. No. 11/151,686", dated Oct. 28, 2008, 17 Pages.
Bos, Bert, "Re: A proposal for addition to HTML 3.0: Frames", Retrieved from http://www.nyct.net/aray/htmlwg/95q3/1141.html, Sep. 21, 1995, 5 Pages.
Billo, E. Joseph, "Creating Charts: An Introduction", In Book of Excel for Chemists: A Comprehensive Guide, Second Edition, 2001, 9 Pages.
"Non- Final Office Action Issued in U.S. Appl. No. 11/151,686", dated Sep. 26, 2007, 15 Pages.
Berliner, et al., "Microsoft Office 2003", Binom-Express Publishing House, Feb. 24, 2004, pp. 173-178.
"Non-Final Office Action Issued in U.S. Appl. No. 11/154,278", dated Nov. 25, 2008, 23 Pages.
"Non-Final Office Action Issued in U.S. Appl. No. 11/154,278", dated Nov. 13, 2009, 32 Pages.
"Final Office Action Issued in U.S. Appl. No. 11/401,470", dated Sep. 23, 2009, 14 Pages.
"Non- Final Office Action Issued in U.S. Appl. No. 11/401,470", dated Mar. 18, 2009, 14 Pages.
"Office Action Issued in U.S. Appl. No. 11/430,416", dated Jun. 27, 2008, 29 Pages.

"Final Office Action Issued in U.S. Appl. No. 11/430,561", dated Aug. 17, 2009, 17 Pages.
"Non-Final Office Action Issued in U.S. Appl. No. 11/430,561", dated Jan. 9, 2009, 16 Pages.
"Final Office Action Issued in U.S. Appl. No. 11/430,562", dated Nov. 13, 2008, 32 Pages.
"Non-Final Office Action Issued in U.S. Appl. No. 11/430,562", dated Jun. 19, 2009, 38 Pages.
"Office Action Issued in U.S. Appl. No. 11/430,562", dated Jan. 7, 2010, 38 Pages.
"Office Action Issued in U.S. Appl. No. 11/430,562", dated May 30, 2008, 30 Pages.
"Final Office Action Issued in U.S. Appl. No. 11/445,393", dated Nov. 24, 2009, 8 Pages.
Berliner, et al., "Microsoft Office 2003", Binom-Express Publishing House, Feb. 24, 2004, pp. 39-40, 120-124, 175-177, 233-234.
Becker, et al., "Virtual Folders: Database Support for Electronic Messages Classification", In Book CODAS, Dec. 1996, pp. 163-170.
Ando, et al., "Visualization-enabled Multi-document Summarization by Iterative Residual Rescaling", In Natural Language Engineering, vol. 11, Issue 1, Mar. 2005, pp. 67-86.
"Office Action Issued in U.S. Appl. No. 11/782,059", dated Aug. 18, 2009, 28 Pages.
Agarwal, Vikash K., "Creating a Visually Arresting User-Interface: A3D Tab Control Example", Retrieved from: http://web.archive.org/web/20080513093733/http://microsoft.apress.com/asptodayarchive/71723/creating-a-visually-arresting-user-interface-a-3d-tab-control-example, Jan. 3, 2008, 12 Pages.
"Office Action Issued in U.S. Appl. No. 12/028,797", dated Apr. 28, 2009, 30 Pages.
"Office Action Issued in Phillipines Patent Application No. 1-2004-000416", dated Mar. 31, 2010., 2 Pages.
"Office Action Issued in Phillipines Patent Application No. 1-2004-000416", dated Sep. 4, 2008, 2 Pages.
"Office Action Issued in Phillipines Patent Application No. 1-2004-000416", dated Mar. 16, 2005, 1 Page.
"Examiner's Action Issued in Philippines Patent Application No. 1-2005-000405", dated Aug. 19, 2008, 1 Page.
"Examiner's Action Issued in Philippines Patent Application No. 1-2005-000405", dated Apr. 21, 2008, 1 Page.
"Examiner's Action Issued in Philippines Patent Application No. 1-2005-000406", dated Apr. 21, 2008, 1 Page.
"Examiner's Action Issued in Philippines Patent Application No. 1-2005-000495", dated Jul. 31, 2008, 1 Page.
"Examiner's Action Issued in Philippines Application No. 1-2005-00406", dated Sep. 12, 2008, 1 Page.
"Office Action Issued in Israel Patent Application No. 164074", dated Mar. 10, 2009, 9 Pages.
"Office Action Issued in Israel Patent Application No. 169716", dated Sep. 6, 2009, 2 Pages.
"Office Action Issued in Israel Patent Application No. 169718", dated Sep. 7, 2009, 2 Pages.
"Office Action Issued in Israel Patent Application No. 170668", dated Oct. 12, 2009, 2 Pages.
"Office Action Issued in Chilean Patent Application No. 1768-2005", dated Nov. 27, 2008, 10 Pages.
"Second Office Action Issued in Chilean Patent Application No. 1768-2005", dated Dec. 4, 2009, 12 Pages.
"Office Action Issued in Chilean Patent Application No. 1769-2005", dated Nov. 27, 2008, 11 Pages.
"Second Office Action Issued in Chilean Patent Application No. 1769-2005", dated Jan. 29, 2010, 14 Pages.
"Office Action Issued in Chilean Patent Application No. 1770-05", dated Mar. 28, 2008, 5 Pages. (W/o English Translation).
"Office Action Issued in Chilean Patent Application No. 1770-2005", dated Sep. 23, 2008, 10 pages.
"Second Office Action Issued in Chilean Patent Application No. 1770-2005", dated Nov. 4, 2009, 14 Pages.
"Office Action Issued in Indian Patent Application No. 1921/DEL/2004", dated Apr. 18, 2017, 2 Pages.
"Office Action Issued in India Patent Application No. 1921/DEL/2004", dated Sep. 12, 2014, 2 Pages.

(56) References Cited

OTHER PUBLICATIONS

"Notice of Allowance Issued in Canadian Patent Application No. 2,482,182", dated Jan. 4, 2017, 1 Page. (W/o English Translation).
"Office Action Issued in Canadian Patent Application No. 2,482,182", dated Feb. 26, 2016, 8 Pages.
"Communication Issued in European Patent Application No. 09006972.5", dated Sep. 28, 2009, 6 Pages.
"Search Report Issued in European Patent Application No. 09006972.5", dated Sep. 7, 2009, 5 Pages.
"Notice of Allowance Issued in Taiwan Patent Application No. 93126908", dated Aug. 25, 2014, 4 Pages.
"Office Action Issued in Taiwan Patent Application No. 093126908", dated Nov. 22, 2012, 10 Pages.
"Office Action Issued in Taiwan Patent Application No. 093126908"dated May 6, 2013, 9 Pages.
"Office Action Issued in Mexican Patent Application No. PA/a/2005/007073", dated Jun. 19, 2009, 6 Pages.
"Office Action Issued in Mexican Patent Application No. PA/a/2004/009395", dated Nov. 11, 2009, 3 Pages.
"Office Action Issued in Indonesian Patent Application No. P00200400478", dated Apr. 3, 2008, 5 Pages.
"Final Office Action Issued in U.S. Appl. No. 10/741,407", dated Jan. 23, 2007, 22 Pages.
"Non-Final Office Action Issued in U.S. Appl. No. 10/741,407", dated Jul. 26, 2006, 22 Pages.
"Final Office Action Issued in U.S. Appl. No. 10/800,056", dated Oct. 19, 2006, 11 Pages.
Olsen, Stefanie, "Yahoo to Test Desktop Search", Retrieved from: http://web.archive.org/web/20070211093209/http://news.com.com/Yahoo+to+test+desktop+search/2100-1032_3-5486381.html, Dec. 9, 2004, 6 Pages.
"Office Action Issued in U.S. Appl. No. 10/800,056", dated Apr. 27, 2006, 8 Pages.
"Office Action Issued in U.S. Appl. No. 10/800,056", dated Jul. 13, 2007, 11 Pages.
"Final Office Action Issued in U.S. Appl. No. 10/836,154", dated Jan. 28, 2008, 26 Pages.
Kurtenbach, et al., "The Hotbox: Efficient Access to a Large Number of Menu-items", In Proceedings of the SIGCHI conference on Human Factors in Computing Systems, May 15, 1999, 7 Pages.
Kundaje, Kunal, "Windows Desktop Search", Retrieved from: http://web.archive.org/web/20051026105719/http://kunal.kundaje.net/reviews/wds.html, Jul. 10, 2005, 7 Pages.
Wagner, Jim, "Microsoft Enters Desktop Search Fray", Retrieved from: http:www.internetnews.com/ent-news/article.php/3447331, Dec. 13, 2004, 5 Pages.
Slovak, Ken, "Absolute Beginner's Guide to Microsoft Office Outlook 2003", Que Publisher, 2003, pp. 237-241.
Halvorson, et al., "Microsoft Office XP Inside Out", In Book—Microsoft Office XP Inside Out, 2001, pp. 1005-1009,1015,1023-1028,1036-1039,1093.
"Office Action Issued in U.S. Appl. No. 10/851,506", dated Apr. 12, 2007, 20 Pages.
Habraken, Joe, "Microsoft Office XP 8 in 1", Retrieved from http://proquest.safaribooksonline.com/0789725096/, Jun. 5, 2001, 12 Pages.
"Office Action Issued in U.S. Appl. No. 10/955,928", dated Jan. 8, 2008, 34 Pages.
Group, Omni, "Omni Web Help", Retrieved from: http://web.archive.org/web/20071118203423/http://www.omnigroup.com/documentation/OmniWeb/browser/tabs.html, Retrieved on: Dec. 5, 2008, 2 Pages.
"Final Office Action Issued in U.S. Appl. No. 10/955,940", dated Apr. 7, 2009, 16 Pages.
Goldberg, et al., "Using Collaborative Filtering to Weave an Information Tapestry", In Communications of the ACM—Special Issue on Information Filtering, vol. 35, Issue 12, Dec. 1992, pp. 61-70.
"Non-Final Office Action Issued in U.S. Appl. No. 10/955,940", dated Jul. 17, 2008, 18 Pages.
"Non-Final Office Action Issued in U.S. Appl. No. 10/955,940", dated Jun. 4, 2007, 20 Pages.

Dyszel, Bill, "Microsoft Outlook 2000 for Windows for Dummies", The Wiley Publication, 1999, 12 Pages.
"Final Office Action Issued in U.S. Appl. No. 10/955,941", dated Apr. 29, 2008, 22 Pages.
Dwelly, Andrew, "Functions and Dynamic User Interfaces", In Proceedings of the Fourth International Conference on Functional Programming Languages and Computer Architecture, Sep. 11, 1989, 11 Pages.
"Non- Final Office Action Issued in U.S. Appl. No. 10/955,941", dated Jul. 11, 2007, 15 Pages.
"Final Office Action Issued in U.S Appl. No. 10/955,942", dated Aug. 4, 2009, 19 Pages.
Chen, et al., "NiagaraCQ: A Scalable Continuous Query System for Internet Databases", In Proceedings of the ACM SIGMOD International Conference on Management of Data, vol. 29, Issue 2, Mar. 2000, pp. 379-390.
Camarda, Bill, "Using Microsoft Word 97", Published by QUE Corporation, Jan. 1997, pp. 412, 869.
"Office Action Issued in U.S. Appl. No. 10/955,942", dated Jul. 11, 2007, 23 Pages.
"Office Action Issued in U.S. Appl. No. 10/955,942", dated Apr. 15, 2008, 25 Pages.
"Final Office Action Issued in U.S. Appl. No. 10/955,967", dated Aug. 4, 2009, 21 Pages.
"Final Office Action Issued in U.S. Appl. No. 10/955,967", dated Apr. 16, 2008, 18 Pages.
Burns, Simon, "Microsoft Reinvents its Own Wheel", Retrieved from: http://web.archive.org/web/20070514034824/http://www.theinquirer.net/default.aspx?article=20214, Dec. 14, 2004, 5 Pages.
"Non-Final Office Action Issued in U.S. Appl. No. 10/955,967", dated Jul. 11, 2007, 19 Pages.
Budinsky, et al., "WebSphere Studio Overview", In IBM Systems Journal, vol. 43, Issue 2, May 6, 2004, 25 Pages.
"Final Office Action Issued in U.S. Appl. No. 10/982,073", dated Jun. 8, 2009, 11 Pages.
"Final Office Action Issued in U.S. Appl. No. 10/982,073", dated May 28, 2008, 10 Pages.
"Non-Final Office Action Issued in U.S. Appl. No. 10/982,073", dated Oct. 9, 2007, 10 Pages.
"Office Action Issued in U.S. Appl. No. 10/982,073", dated Dec. 11, 2008, 12 Pages.
Boyce, Jim, "Microsoft Outlook Inside Out Version", In Book Microsoft Outlook Version 2002 Inside Out, 2001, pp. 67, 68, 109, 110, 230, 231, 310, 316-318, 798.
"Notice of Allowance Issued in Korean Patent Application No. 10-2004-70500", dated Jan. 5, 2013, 8 Pages.
"Office Action Issued in Korean Patent Application No. 10-2004-70500", dated Jan. 7, 2011, 6 Pages.
"Office Action Issued in Korean Patent Application No. 10-2004-70500", dated Sep. 22, 2011, 3 Pages.
"Office Action Issued in Canadian Patent Application No. 2,482,182", dated May 7, 2012, 3 Pages.
"Office Action Issued in Canadian Patent Application No. 2,482,182", dated Jan. 22, 2013, 4 Pages.
"Second Office Action Issued in Canadian Patent Application No. 2,482,182", dated Feb. 20, 2015, 8 Pages.
"Office Action Issued in Chinese Patent Application No. 200410088294.4", dated Aug. 10, 2007, 12 Pages.
"Office Action Issued in Chinese Patent Application No. 200410088294.4", dated Feb. 1, 2008, 29 Pages.
"Office Action Issued in Chinese Patent Application No. 200410088294.4", dated Jul. 4, 2008, 6 Pages.
"Office Action Issued in Russian Patent Application No. 2004131031", dated Nov. 14, 2008, 7 Pages.
"Notice of Allowance Issued in Australian Patent Application No. 2004216596", dated Feb. 24, 2010, 3 Pages.
"Office Action Issued in Australian Patent Application No. 2004216596", dated Oct. 20, 2009, 2 Pages.
"Notice of Allowance Issued in Japanese Patent Application No. 2004-302186", dated Oct. 18, 2011, 6 Pages.
"Office Action Issued in Japanese Patent Application No. 2004-302186", dated Dec. 10, 2010, 7 Pages.

(56) References Cited

OTHER PUBLICATIONS

"Office Action Issued in Japanese Patent Application No. 2004-302186", dated Jun. 10, 2011, 4 Pages.
"Search Report Issued in Singapore Patent Application No. 200504474-8", dated Jan. 16, 2007, 8 Pages.
"Search Report Issued in Singapore Patent Application No. 200504475-5", dated Sep. 19, 2006, 15 Pages.
"Search Report Issued in Singapore Patent Application No. 200504508-3", dated Sep. 18, 2006, 6 Pages.
"Written Opinion Issued in Singapore Patent Application No. 200504508-3", dated Sep. 18, 2006, 9 Pages.
"Search Report Issued in Singapore Patent Application No. 200505257-6", dated Feb. 12, 2007, 6 Pages.
"First Office Action Issued in Chinese Patent Application No. 200510089514.X", dated May 23, 2008, 16 Pages.
"Office Action Issued in Chinese Patent Application No. 200510089514.X", dated Apr. 3, 2009, 12 Pages.
"Second Office Action Issued in Chinese Patent Application No. 200510089514.X", dated Nov. 21, 2008, 14 Pages.
"First Office Action Issued in Chinese Patent Application No. 200510092139.4", dated Mar. 21, 2008, 25 Pages.
"Second Office Action Issued in Chinese Patent Application No. 200510092139.4", dated Oct. 17, 2008, 19 Pages.
"Third Office Action Issued in Chinese Patent Application No. 200510092139.4", dated Jun. 19, 2009, 7 Pages.
"First Office Action Issued in Chinese Patent Application No. 200510092141.1", dated Apr. 11, 2008, 22 Pages.
"Second Office Action Issued in Chinese Patent Application No. 200510092141.1", dated Oct. 10, 2008, 22 Pages.
"First Office Action Issued in Chinese Patent Application No. 200510092142.6", dated Apr. 18, 2008, 22 Pages.
"Second Office Action Issued in Chinese Patent Application No. 200510092142.6", dated Oct. 16, 2009, 9 Pages.
"First Office Action Issued in Chinese Patent Application No. 200510092146.4", dated Mar. 21, 2008, 21 Pages.
"Russian Office Action Issued in Application No. 2005120363/09", dated Oct. 26, 2009, 12 Pages.
"Office Action Issued in Russian Patent Application No. 2005120363/28", dated Jun. 24, 2009, 8 Pages.
Office Action received for Russian Patent Application No. 2005125831/09, dated Jul. 30, 2009, 17 Pages.
"Office Action Issued in Russian Patent Application No. 2005125837/09", dated Jul. 21, 2009, 10 Pages.
"Office Action Issued in Russian Patent Application No. 2005125839/09", dated Sep. 10, 2009, 16 Pages.
"First Office Action Issued in Chinese Patent Application No. 200680018095.3", dated Jul. 3, 2009, 14 Pages.
"Second Office Action Issued in Chilean Patent Application No. 2512-2005", dated Mar. 4, 2009, 12 Pages.
"Examination Report Issued in New Zealand Patent Application No. 541299", dated Jul. 25, 2005, 2 Pages.
"Examination Report Issued in New Zealand Patent Application No. 541300", dated Jul. 25, 2005, 2 Pages.
"Examination Report Issued in New Zealand Patent Application No. 541301", dated Jul. 25, 2005, 2 Pages.
Schumaker, Dennis, "User Interface Standards", Retrieved from: https://msdn.microsoft.com/en-us/library/aa217660(office.11.d=printer).aspx, Sep. 2001, 5 Pages.
"About Google Desktop Search", Retrieved from: http://web.archive.org/web/20041015131838/http://desktop.google.com/about.html, Oct. 15, 2004, 8 Pages.
Riggsby, et al., "Mastering Lotus Notes and Domino 6", In the Complete Guide to Using and Developing for Lotus Notes and Domino 6, 2003, pp. 18, 22, 33-35, 47, 122, 123, 215-241, 378.
"Convert to Word 2007", Retrieved from: http://www.regencytraining.com/word-2007-conversion.html, Retrieved on: Apr. 21, 2008, 2 Pages.
"Customer Story: SourceXtreme", Retrieved from: http://web.archive.org/web/20071028070032/http://trolltech.com/customers/casestories/stories/sourcextreme/, Apr. 22, 2008, 2 Pages.

"Find Any File or Email on Your PC as Fast as You can Type", Retrieved from: http://www.x1.com, Jan. 1, 2003, 1 Page.
"Inter-Widget Communication", Retrieved from: http://web.archive.org/web/20071204004440/http://web.mit.edu/6.115/www/miscfiles/amulet/amulet-help/IWC.htm, Retrieved on: Apr. 22, 2008, 6 Pages.
"Lookout", Retrieved from: http://web.archive.org/web/20040402233643/http://www.lookoutsoft.com/, Apr. 22, 2005, 20 Pages.
"Managing the Code Editor and View", Retrieved from: https://web.archive.org/web/20090714151035/http://msdn.microsoft.com/en-us/library/z01zks9a(VS.71).aspx, Jan. 2008, 3 Pages.
Riggsby, et al., "Mastering Lotus Notes and Domino 6", In The Complete Guide to Using and Developing for Lotus Notes and Domino 6, 2003, pp. 135-139.
Riggsby, et al., "Mastering Lotus Notes and Domino 6", In The Complete Guide to Using and Developing for Lotus Notes and Domino 6, 2003, pp. 135-138, 607-612.
Rich, et al., "Adding a Collaborative Agent to Graphical User Interfaces", In Proceedings of the 9th Annual ACM Symposium on User Interface Software and Technology, Jan. 1996, 10 Pages.
Pogue, David, "Windows XP Home Edition: The Missing Manual", In Publication of O'Reilly, 1st Edition, May 1, 2002, pp. 37, 38 and 41.
Piperoglou, Stephanos, "What's Hot in Internet Services?", Retrieved from: https://web.archive.org/web/19990508222358/http://www.webreference.com/html/tutorial5/3.html, Aug. 20, 1998, 3 Pages.
Piperoglou, Stephanos, "The Style Element & CSS Selectors", Retrieved from: http://www.webreference.com/html/tutorial5/4.html, Aug. 20, 1998, 3 Pages.
Piperoglou, Stephanos, "The Style Attribute and CSS Declarations", Retrieved from: https://web.archive.org/web/20150922213836/http://www.webreference.com/html/tutorial5/2.html, Aug. 20, 1998, 3 Pages.
Piperoglou, Stephanos, "Separate Structure and Presentation", Retrieved from: https://web.archive.org/web/20161012144134/http://www.webreference.com/html/tutorial5/1.html, Aug. 20, 1998, 4 Pages.
"Microsoft Outlook 2000: Introduction to Calendar", Retrieved from: http://web.archive.org/web/20041102044718/http://www.uakron.edu/its/learning/training/docs/Calendar032502.pdf, Mar. 25, 2002, pp. 1-52.
"Microsoft Publisher 11 Beta Layperson's Specification", Microsoft Corporation, 2002, 13 Pages.
Piperoglou, Stephanos, "ID & Class Selectors, Pseudoclasses", Retrieved from: http://www.webreference.com/html/tutorial5/6.html, Aug. 20, 1998, 3 Pages.
Piperoglou, Stephanos, "External Style Sheets", Retrieved from: https://web.archive.org/web/20150923022741/http://www.webreference.com/html/tutorial5/10.html, Aug. 20, 1998, 3 Pages.
"MSN Desktop Search (beta)", Retrieved From: http://www.pcmag.com/article2/0,1759,1771841,00.asp, Mar. 2, 2005, 2 Pages.
"Office Action Issued in Malaysian Patent Application No. PI20043832", dated Dec. 31, 2009, 3 Pages.
"Primary Windows", Retrieved from: http://web.archive.org/web/20070716034907/http://www-03.ibm.com/servers/eserver/iseries/navigator/guidelines/primary.html, Retrieved on: Feb. 23, 2007, 23 Pages.
"Rainy's Rainlendar", Retrieved from: http://web.archive.org/web/20040812092939/www.ipi.fi/rainy/index.php?on=projects&project=rainlendar, Retrieved on: Aug. 12, 2004, 18 Pages.
"Office Action Issued in Brazilian Patent Application No. PI0404376-6", dated Jul. 15, 2016, 4 Pages.
Venolia, et al., "Understanding Sequence and Reply Relationships within Email Conversations: A Mixed-Model Visualization", In Proceedings of the SIGCHI Conference on Human Factors in Computing Systems, vol. 5, Issue 1, Apr. 5, 2003, pp. 361-368.
"Notice of Allowance Issued in Malaysia Patent Application No. PI 20043832", dated Nov. 14, 2014, 2 Pages.
"International Search Report and Written Opinion Issued in PCT Application No. PCT/US2009/046344", dated Dec. 29, 2009, 11 Pages.
"International Search Report and Written Opinion Issued in PCT Application No. PCT/US2009/046341", dated Nov. 30, 2009, 11 Pages.

(56) References Cited

OTHER PUBLICATIONS

"International Search Report and Written Opinion Issued in PCT Application No. PCT/US2007/012573", dated Nov. 27, 2007, 9 Pages.
"International Search Report and Written Opinion Issued in PCT Application No. PCT/US2006/035467", dated Feb. 6, 2007, 10 Pages.
"International Search Report and Written Opinion Issued in PCT Application No. PCT/US2006/034993", dated Feb. 26, 2007, 11 Pages.
"Software License Use Management (XSLM)", Retrieved From: http://pubs.opengroup.org/onlinepubs/9691999399/toc.pdf, Mar. 1999, 286 Pages.
"TeeChart for NET Charting Control", Retrieved from: http://web.archive.org/web/20030127080821/http://www.teechart.net:80/, Retrieved on: Jan. 27, 2003, 4 Pages.
"The Technology in Document and Check Security", Retrieved from: http://www.securedoc.in/thetechnology.htm, Retrieved on: Apr. 21, 2008, 7 Pages.
"To-do List—Effective Task Management Software", Retrieved from: https://web.archive.org/web/20070521185648/http://www.programurl.com:80/to-do-list.htm, Retrieved on: Jan. 2, 2007, 6 Pages.
"International Search Report and Written Opinion Issued in PCT Application No. PCT/US2006/012724", dated Oct. 17, 2007, 11 Pages.
Padwick, Gordon, "Using Microsoft Outlook 2000", In Book—Using Microsoft Outlook 2000, Que Publishers, Special Edition, May 1999, pp. 530-533.
"Office Action Issued in Mexican Patent Application No. PA/a/2005/008351", dated Mar. 3, 2009, 4 Pages.
"Notice of Allowance Issued in Thailand Patent Application No. 0401003526", dated Mar. 7, 2018, 1 Page.
"Office Action Issued in Thailand Patent Application No. 0401003526", dated Aug. 31, 2016, 2 Pages.
"Search Report Issued in European Patent Application No. 04021618.6", dated May 24, 2005, 5 Pages.
"Search Report Issued in European Patent Application No. 04021618.6", dated Jul. 11, 2005, 3 Pages.
"Office Action Issued in Colombian Patent Application No. 04-094.972", dated Aug. 21, 2007, 3 Pages.
"Office Action Issued in Colombian Patent Application No. 04-094.972", dated Oct. 17, 2008, 9 Pages.
"Communicated Action Received for European Patent Office Application No. 04102463.02211", dated Oct. 20, 2005, 4 Pages.
"Summons to Attend Oral Proceedings Received for European Patent Application No. 04102463.9", Mailed Date: Jun. 23, 2008, 76 Pages.
"Office Action Issued in Mexican Patent Application No. PA/a/2005/008349", dated Feb. 5, 2009, 10 Pages.
"European Communication cited in Application No. 07795391.7", dated Sep. 14, 2009, 5 Pages.
"Office Action Received in Canada Patent Application No. 2482182", dated Nov. 26, 2013, Filed Date: Sep. 20, 2004, 6 Pages.
"Refusal Letter in Indian Patent Application No. 1921/DEL/2004", dated Jun. 19, 2019, 3 Pages.

* cited by examiner

PROGRAMMING INTERFACE FOR LICENSING

FIELD OF THE INVENTION

The present invention relates generally to the field of computer software, and, more particularly, to a programming interface that supports the enforcement of electronic licenses.

BACKGROUND OF THE INVENTION

Commercially-produced software has traditionally been made available under a license that defines the permissible terms of the software's use. When the practice of software licensing first began, the license generally took the form of a legal document that defined the user's rights with respect to the software. Such a document relied upon the legal system for enforcement. It has since become desirable for licenses to be enforced electronically—i.e., it is desirable that a computer program contain code that actively discourages or prevents use of the software in a manner that is contrary to the license.

Most software that provides for electronic license enforcement provides its own infrastructure to manage the licensing of the software and the use of the licenses. Thus, a typical commercial software product may include not only the code to perform the product's core function, but may also carry with it the code to obtain, evaluate, protect, and manage licenses for the software. For each software vendor to develop and incorporate this infrastructure into its software is often a wasteful duplication of effort. It is therefore desirable to provide a system that performs the basic functions related to software licensing, where the system can be used by a broad variety of software applications in a uniform and defined way.

In view of the foregoing, there is a need for a mechanism that overcomes the drawbacks of the prior art.

SUMMARY OF THE INVENTION

The present invention provides a software licensing Application Programming Interface (API) or callable interface that provides certain licensing functions for use by software products. A license service or licensing component performs functions relating to the use of licenses, and exposes these functions to software products through the API. The service performs functions such as obtaining licenses, storing and managing licenses, protecting licenses from tampering, evaluating a license's validity, and evaluating whether a license is correctly bound to the machine and/or software product on which it is used. The software is able to make use of this functionality by calling the methods of the API.

In a typical use of the API, a software product calls an "open" API method or handle-opening component in order to obtain a unique handle that is used by the license service to identify the application. The software product then calls a "consume right" API method or right-consumption component. "Consume," in this context, means the exercise of a specified right. The call to the "consume right" method is parameterized by the software product's handle, and by the name of the right to be consumed. The license service then attempts to locate one or more valid, correctly bound licenses that contains the named right. If no such license exists, then the software product is notified of the failure. If such licenses exist, then the right is bound to one of the licenses, and the calling software product is notified of the binding. In such a case, the software product knows that the right exists, and can perform whatever functions are associated with this right.

In a preferred embodiment, the license service does not define what the software can or cannot do under the right, or enforce substantive constraints on the use of the software. Rather, the license service manages the licenses in such a way that a software product can determine by calling the API whether a right does, or does not, exist, so that the software can behave accordingly. For example, a right may be called "run," indicating that the user has the right to run the software product. The software product can use the API to determine whether there is a valid (and correctly bound, and non-expired) right to run the software. However, if the API call returns with an indication that there is no right to run the software, it is up to the software to cease operation or take some other action based on the non-existence of this right.

A right may be associated with information, which becomes available after a successful call to the "consume right" method. For example, a given software product may have individual rules about when it is permissible to edit, print, save, etc., and these rules can be stored in the license that contains the right. The API provides a "get information" method or information-retrieval component that allows this information to be retrieved from the license.

Other features of the invention are described below.

BRIEF DESCRIPTION OF THE DRAWINGS

The foregoing summary, as well as the following detailed description of preferred embodiments, is better understood when read in conjunction with the appended drawings. For the purpose of illustrating the invention, there is shown in the drawings exemplary constructions of the invention; however, the invention is not limited to the specific methods and instrumentalities disclosed. In the drawings.

DETAILED DESCRIPTION OF THE INVENTION

Overview

The use of commercial software is typically governed by a license, and it has become increasingly common for this license to be embodied in an electronic form that can be enforced by the software itself. One challenge in creating an electronic licensing system is that an infrastructure is needed to manage the use of the licenses. Replicating this infrastructure for every software product is cumbersome and wasteful. The present invention provides an API that allows different software products to use a common infrastructure that performs various licensing functions.

Exemplary Computing Arrangement

Figure 1:
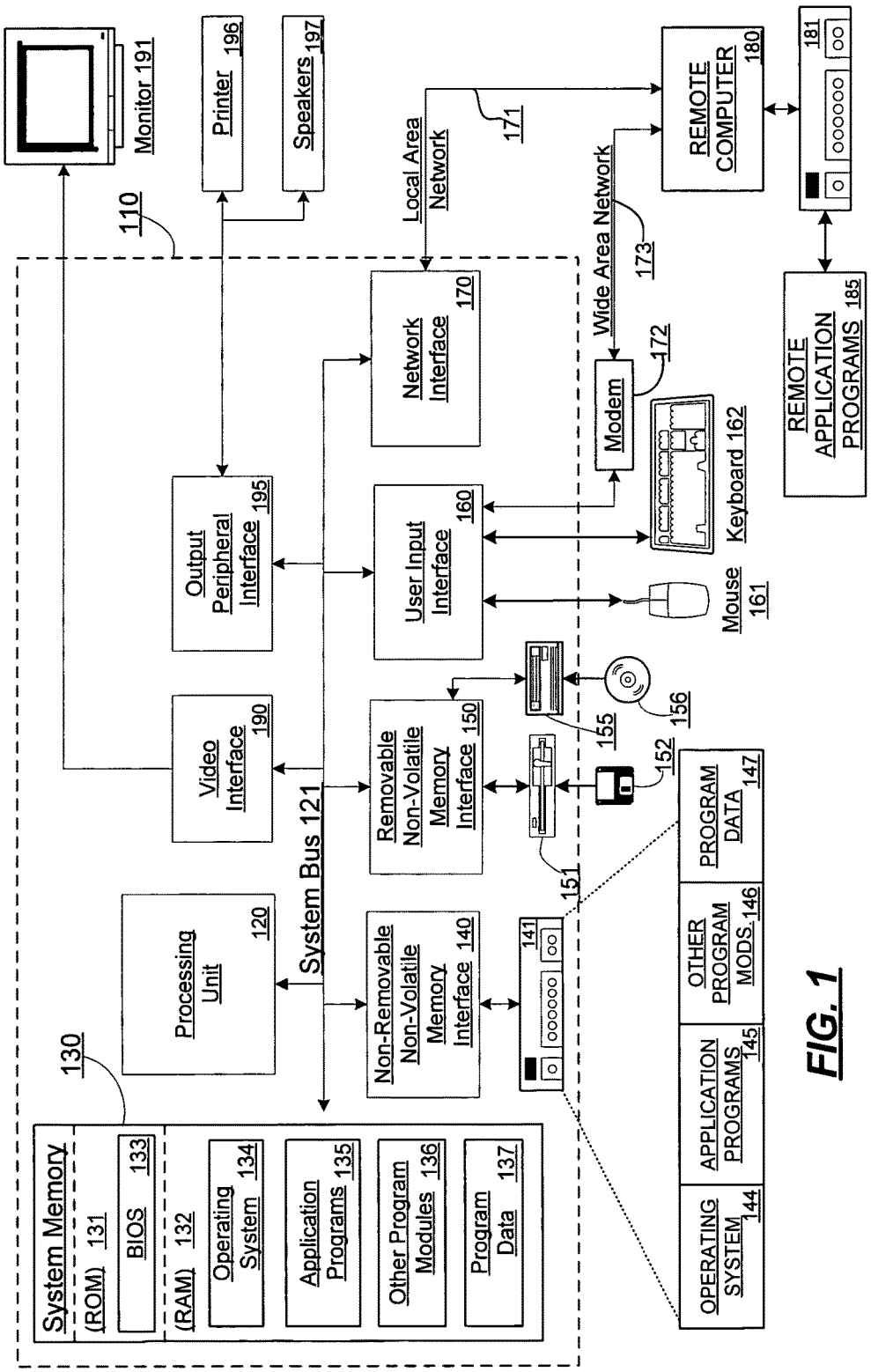
FIG. 1 is a block diagram of an example computing environment in which aspects of the invention may be implemented.

FIG. 1 shows an exemplary computing environment in which aspects of the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, embedded systems, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. Various terms, including component, method, service, interface, module, routine, and program, are used interchangeably to refer to a group of computer-executable instructions stored in a computer-readable medium. The invention may also be practiced in distributed computing environments where tasks are performed by remote processing devices that are linked through a communications network or other data transmission medium. In a distributed computing environment, program modules and other data may be located in both local and remote computer storage media including memory storage devices.

With reference to FIG. 1, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The processing unit 120 may represent multiple logical processing units such as those supported on a multi-threaded processor. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (also known as Mezzanine bus). The system bus 121 may also be implemented as a point-to-point connection, switching fabric, or the like, among the communicating devices.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removeable media implemented in any method or technology for storage of information such as computer readable instructions, data structures, program modules or other data. Computer storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other medium which can be used to store the desired information and which can accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 140 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156, such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 20 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Software Licensing Service

Figure 2:
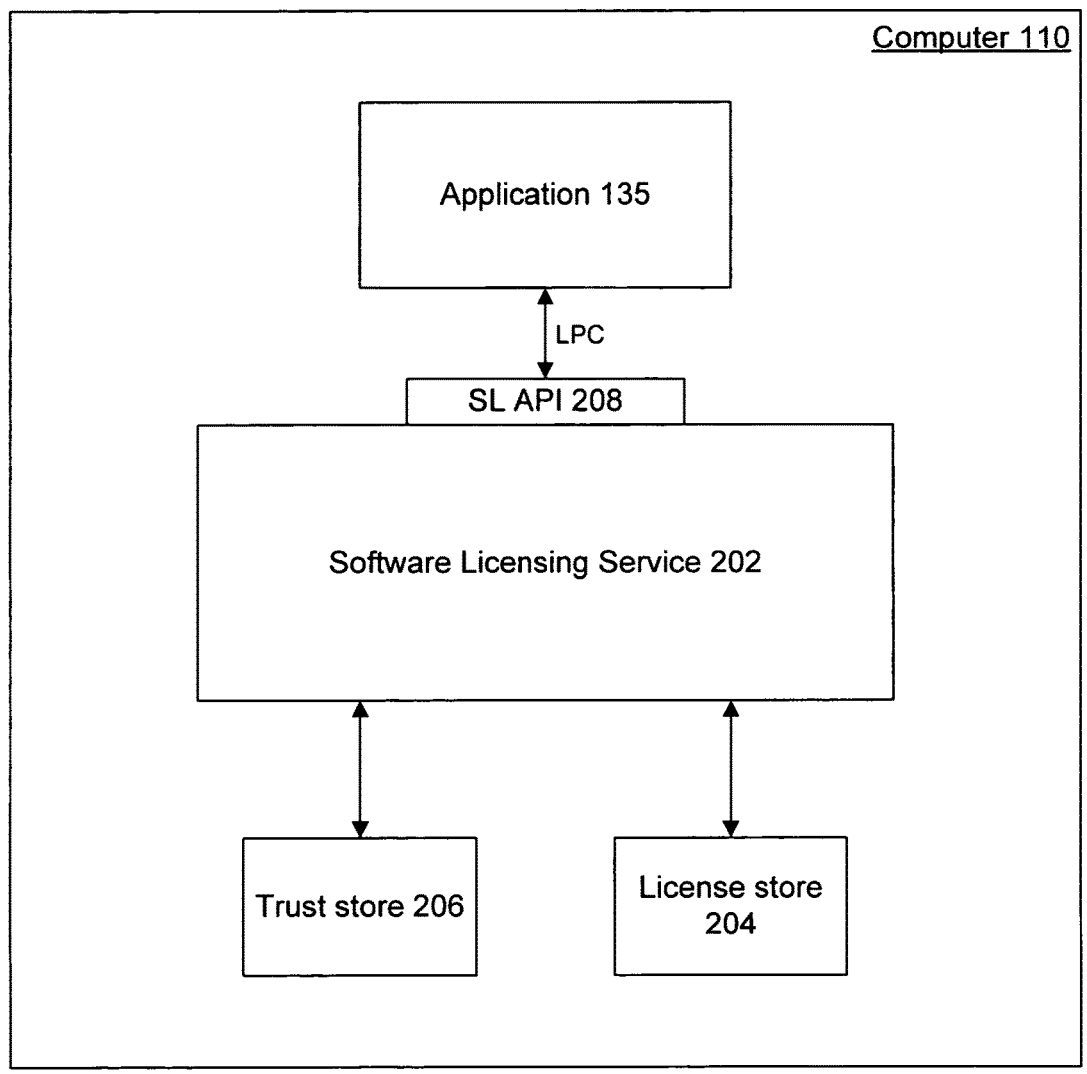
FIG. 2 is a block diagram of an architecture in which a system performs licensing functions and exposes an API for use by software products.

FIG. 2 shows an example system that provides a software licensing service 202. Software licensing service 202 operates inside of computer 110 (shown in FIG. 1). In one example, software licensing service 202 is part of an operating system that executes on computer 110. Software licensing service maintains a license store 204 in which license files for software are stored. License files may, for example, be extensible Rights Markup Language (XrML) files that specify rights to software, and that also may specify various types of conditions on the exercise of those rights. Software 204 also maintains a trust store 206. Trust store 206 stores un-authenticatable, dynamic data in a tamper-resistant manner; trust store 206 stores data that is used in the license validation process. For example, certain licenses may have expiration dates, and, in order to prevent the expiration data from being circumvented through clock rollback, the current time (and elapsed time) may be periodically stored in trust store 206 to ensure that the clock is always moving forward.

Software licensing service 202 manages license store 204 and trust store 206, and also performs various functions relating to the licensing of software. For example, software licensing service 202 may contain modules that parse license files, modules that enforce the binding of a license to a particular machine and/or to a particular instance of a software product, and a secure timer/counter (that uses trust store 206 in the manner described above).

Software licensing service 202 exposes an application programming interface (API) 208 that allows application software (such as application 135) to use software licensing service 202. Application 135 may invoke the features of software licensing service 208 by making local procedure call (LPC) to the methods of API 208. An example set of API methods that may be exposed by software licensing service 202 is described below.

Figure 3:
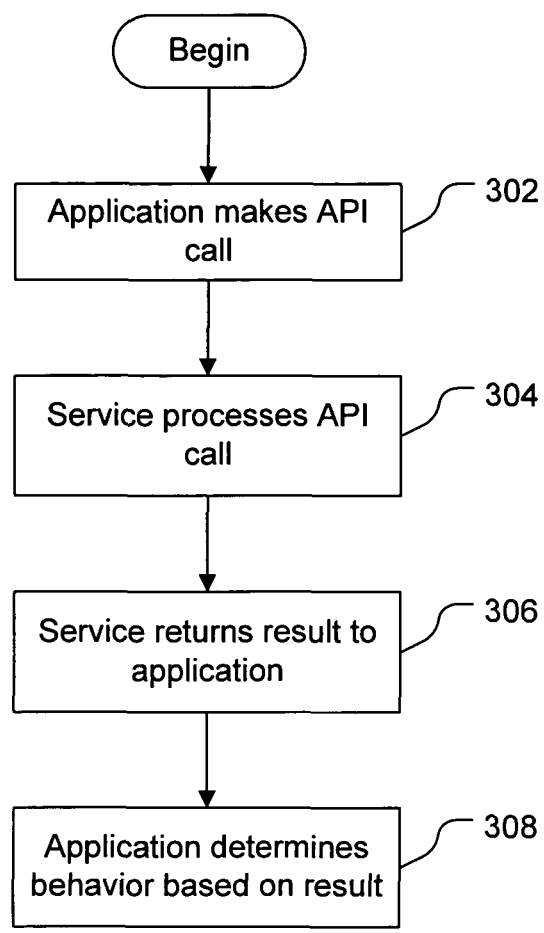
FIG. 3 is a flow diagram of a method through which a software product uses a licensing API.

The manner in which API 208 is used by an application is described with reference to FIG. 3. Initially, the application makes an API call (302). Service 202 then processes the API call (304), and returns the result of the API call to the application 306. For example, an API call may request to exercise ("consume") a right granted in a license, or to retrieve information from a license. The application then receives the result of the API call, and determines, based on that result, what the application's behavior should be (308). In other words, software licensing service 202, in a preferred embodiment, does not enforce a license directly, but rather provides the infrastructure through which licenses can be managed and used. For example, if an application makes an API call to consume a right and service 202 determines that there is no valid license granting this right, service 202, in a preferred embodiment, does not prevent the application from running, but instead informs the application that the right is not available. Thus, the application can use its own mechanisms to determine what to do in response to the unavailability of the right. This facet of the API provides software vendors the flexibility to decide how the licensing infrastructure provided by service 202 should be used. In another implementation, application can be bound to licensing service functionality.

Example Software Licensing API

The following is an example set of API methods that may be exposed by a software licensing service:

SLOpen

The SLOpen function opens a SL client context handle that must be used for all subsequent SL API calls. (Throughout the example API descriptions, "SL" shall refer to the software licensing service. Thus, the SL client context handle is the handle used by a client in communicating with the software licensing service.)

```
HRESULT
SLOpen(
    CONST GUID*    pguidApp,
    HSLC*    phSLC
    );
```

Parameters pguidApp

[in] Pointer to application GUID that uniquely identifies an application. If this argument is NULL, an E_INVALIDARG error is returned.

phSLC

[out] SL client context Handle or INVALID_HANDLE_VALUE if failed.

Remarks

Use the SLClose function to close an context handle returned by SLOpen.

Application GUID: Unique ID of application. For the WINDOWS version of the MICROSOFT OFFICE application suite, WinWord has an Application GUID which is different from Excel's Application GUID. For Windows, Windows itself is an application, although it is a composite of many programs.

In Office case, A user can install both Office Suite and WinWord standalone products on the machine. From SL point of view, the WinWord in both products has same Application GUID. WinWord's Application GUID associated to two Product GUID. In other words, WinWord can use either Office Suite's product license or WinWord's product license.

When SLOpen succeeds:

A RPC (remote procedure call) binding has been established.

A context memory is created on SL service. The context is used to keep the status information for the caller of the client.

The SLC handle is like a file handle. A process can open multiple SL context handles but handles are valid within the caller process.

Returns

Success or failure

SLClose

The SLClose function closes an opened SL client context handle. Any information in the context is released automatically.

```
HRESULT
SLClose(
    HSLC     hSLC
);
```

Parameters hSLC

[in] Handle to current SL client context handle

Remarks

When SLClose is done, the RPC binding is released, and the context is destroyed.

Returns

Success or failure.

SLInstall

The SLInstall function installs applications' licenses and registers applications' information.

```
HRESULT SLInstall(
    HSLC              hSLC,
    CONST SL_PRODKEY*     pAppPrdKey,
    DWORD             dwNumOfApps,
    CONST GUID*           pguidApps,
    DWORD             dwNumOfLicFiles,
    PCWSTR            ppszLicFiles[ ],
    BOOL              bVerify
);
```

Parameters hSLC

[in] Handle to current SL client context handle pAppPrdKey

[in] Application product key structure. The product key can be Microsoft product key format or Application's product key format.

```
typedef struct_tagSL_PRODKEY
{
    DWORD cbSize;                            // Size of SL_PRODKEY structure
    DWORD dwVersion;          // Version of SL_PRODKEY structure
    WCHAR szProdKey[MAX_PRODKEYSTR_SIZE+1];
    SL_PRODKEY_TYPE eProdKeyType;         // Type of Product key
    SL_CUSTOM_PRODKEY_INFO CustomPrdKeyInfo;    // Customer product key info
} SL_PRODKEY;
```

The eProdKeyType can be one of following values:

SL_PRODKEY_CUSTOM

SL_PRODKEY_MS2002

SL_PRODKEY_MS2003

If the Product Key type is non-MS Product Key (i.e. eProdKeyType=SL_PRODKEY_CUSTOM), the caller has to fill in its custom product key information. If the product uses MS Product Key, then CustomPrdKeyInfo can be ignored.

```
typedef struct _tagSL_CUSTOM_PRODKEY_INFO
    DWORD dwSKUID;              // Unique ID for specific SKU, for example Group ID in MS PID.
    DWORD dwSerialNumber;       // unique serial number, e.g. channel + sequence number in MS PID.
} SL_CUSTOM_PRODKEY_INFO;
```

Current version number of SL_PRODKEY is 1. The caller can use SL_CURRENT_PRODKEY_VERSION in dwVersion field.

dwNumOfApps

[in] The number of application GUID in pguidApps.

pguidApps

[in] A list of application of GUID. The application GUID represents the application that the license is being installed for. For example, Office Setup program can call this function to install the license(s) for Word, Excel by specifying each application GUID in pguidApps. pguidApp cannot be NULL here.

dwNumOfApps

[in] The number of license files.

ppszLicFile

[in] File names in array of strings.

Returns

Success or failure

SLUninstall

The SLUninstall function uninstalls a product's license from an application.

```
HRESULT SLUninstall (
    HSLC         hSLC,
    CONST SL_PRODKEY* pAppPrdKey
);
```

Parameters
hSLC
[in] Handle to current SL client context handle
pAppPrdKey
[in] See above definition in connection with SLInstall.
Remarks
An application could have more than one product licenses. For example, when the user uninstalls Office suite, the association between Office Suite license and WinWord should be removed, but the license from WinWord Standalone product should not be removed.

When SLUninstall succeeds:
The information associated with this Product Key is removed. (see SLInstall, above, for the associated information)
The product keys associated with the Application GUID is removed.
The license files associated with the product GUID are preferably still kept.
Returns
Success or failure SLConsumeRight
The SLConsumeRight function lets an application to examine or exercise the rights on a locally-stored license. Calling this function binds a license to the right mentioned in pszRightName. If this right cannot be exercised by the current caller, then the application fails. If the function succeeds, the action associated with the right can be executed (like decreasing usage count, decreasing time quota, or nothing)

```
HRESULT SLConsumeRight(
    HSLC            hSLC,
    PCWSTR          pszRightName,
    SL_ASYNC_CONTEXT*   pAsyncContext
);
```

Parameters
hSLC
[in] Handle to current SL client context handle
pszRightName
[in] The name of right needs to be evaluated. In current design, the right name is defined by applications. SL opens the license and evaluates the condition based on the right name.
pAsyncContext
[in/out] IfpAsyncContext is NULL, this function works in synchronous mode, otherwise, the function works in asynchronous mode. SL_ASYNC_CONTEXT is opaque to caller and managed by SLC.
Remarks
All licenses associated with the application GUID (specified in SLOpen) will be conceptually combined in one logic license.
If their are multiple consumable grants of the right, then the license with higher priority will be consumed first.

Returns
Success or failure

SLInitializeAsyncContext
The SLInitializeAsyncContext function or asynchronous-context-initiator component initializes the asynchronous context for SLC functions to make asynchronous call.

```
HRESULT SLInitializeAsyncContext(
    SL_ASYNC_CONTEXT* pAsyncContext,   // asynchronous context
    HANDLE hEvent,                      // event handle
    PVOID pvReserved                    // reserved, NULL
);
```

Parameters
pAsyncContext
[in/out] pointer to asynchronous context that contains asynchronous call information.
hEvent
[in] The event object used for synchronization.
pvReserved
[in] reserved for extension.
Returns
Success or failure.

SLCancelAsyncCall
The SLCancelAsyncCall fiuction is used to cancel an asynchronous call.

```
HRESULT SLCancelAsyncCall(
    SL_ASYNC_CONTEXT*   pAsyncContext,   // asynchronous context
    BOOL                fAbortCall       // cancel immediately
);
```

Parameters
pAsyncContext
[in] asynchronous context for SL asynchronous call.
fAbortCall
[in] If TRUE, the call is cancelled immediately. If FALSE, wait for the SL to complete the call.
Remarks
There are two ways for the caller to request cancellation of an asynchronous call-abortive and nonabortive. In an abortive cancel (fAbortCall is TRUE), the SLCancelAsyncCall function sends a cancel notification to the SLC and the asynchronous call is canceled immediately, without waiting for a response from the SLC. In a nonabortive cancel (fAbortCall is FALSE) the SLCancelAsyncCall function notifies SLC of the cancel and the caller waits for SLC to complete the call.
Returns
Success or failure.

SLCompleteAsyncCall
The SLCompleteAsyncCall function is used to complete an SLC asynchronous call.

```
HRESULT SLCompleteAsyncCall(
    SL_ASYNC_CONTEXT*   pAsyncContext,   // asynchronous context
    HRESULT*            phrAsyncCall     // error code of the submitted asynchronous call
);
```

Parameters
pAsyncContext
[in] asynchronous context for SL asynchronous call.
phrAsyncCall
[out] the error code of the submitted asynchronous call.
Remarks If the caller calls this function before the reply has arrived, the call returns E_SLC_ASYNC_CALL_PENDING. The buffer must be valid and it must be big enough to receive the return value. If the call does not return E_SLC_ASYNC_CALL_PENDING, this SLCompleteAsyncCall invocation is final for the asynchronous call. After this function call, regardless of success or failure, all resources allocated for this asynchronous call are freed. (Subsequent calls to the SLCompleteAsyncCall or SLCancelAsyncCall functions have undefined results until a new call on the SL_ASYNC_CONTEXT structure is initiated).

Returns

| Value | Meaning |
| --- | --- |
| S_OK | The call was completed successfully. |
| E_SLC_INVALID_ASYNC_CONTEXT | The asynchronous call context is not valid. |
| E_SLC_ASYNC_CALL_PENDING | The call has not yet completed. |
| E_SLC_CALL_CANCELLED | The call was cancelled. |

SLGetInformation

The SLGetLicenseInfo function is used to get a variety of information.

```
HRESULT SLGetInfomation(
    HSLC        hSLC,           // SL client context handle
    DWORD       dwCategory,     // The category of information
                                //   to retrieve
    PCWSTR      pszKeyName,     // Name of the Key
    DWORD*      pdwType,        // Type of value
    SIZE_T*     pcbValue,       // Size of value
    PBYTE*      ppbValue        // Pointer to buffer of value
);
```

Parameters
hSLC
[in] Handle to current SL client context handle
dwCategory
[in] The category of information.

| Category | Meaning | | |
| --- | --- | --- | --- |
| SL_CAT_RIGHTDATA | Get the information from bound right. The license has to be consumed successfully before getting these right data. | | |
| SL_CAT_DYNAMICPROPERTY | Get the information that is not in the license but calculating in the run-time. For example, RemainingGracePeriodDays. The right has to be consumed before calling. | | |
| | Name | Meaning | |
| | RemainingGracePeriodDays: DWORD | The grace period is defined in out-of-box license. Once the application is installed, the time is counting down. Applications can check remaining grace period after they have consumed license. | |
| | ActivationStatus: DWORD | After applications consumed license, it can get consumed license type. The return value could be: | |
| | | SL_LIC_OOB | The consumed license is out-of-box license. |
| | | SL_LIC_ACQUIRED | The consumed license is acquired license. |
| | | SL_LIC_NONE | No license is available. |
| SL_CAT_SERVICEINFO | Get the information that is not dependent on license. The caller can get this category of information without consuming license. | | |
| | Name | Meaning | |
| | SLVersion: DWORD | The version of SL. 1.2.3.4 format. | |
| | HWID: BINARY | Current HWID | |
| SL_CAT_WINDOWSINFO | Get information that is bound right property in Windows license. This is for Componentization. Windows License has been consumed by SL service and SL service keeps the bound right properties. | | |
| SL_CAT_ENUMLICINFO | When SLEnumLicenseis called and is succeed, the caller can query the information of enumerated license by using this category. | | | pszKeyName
[in] the name of the key. E.g. BuildNumber
pdwType
[out] type of data

| Value | Meaning |
|---|---|
| SL_DATATYPE_SZ | Unicode string |
| SL_DATATYPE_DWORD | DWORD |
| SL_DATATYPE_BINARY | Binary | pcbValue
[out] Size of the buffer allocated (in bytes).
ppbValue
[out] If successful, the data is returned in the buffer allocated by SLC. The caller has to call SLFreeMemory to free the memory.
Returns
Success or failure
SLAcquireLicense
The SLAcquireLicense function is used to acquire on-line license for the user. SLC enumerates the product keys associated with the Application and picks up the product key with highest product priority (see SLInstall, registration information). Then SL gets the clearing house URL from out-of-box license and connects to clearing house to get a license.

SLAcquireLicense could be a lengthy process. Applications can call this function in asynchronous mode by specifying pAsyncContext (NULL means synchronous mode).

```
HRESULT SLAcquireLicense(
    HSLC     hSLC,               // SL client context handle
    PCWSTR   pszProdKeyHash,     // hash of product key
    PCWSTR   pszPublishLicense,  // string of publishing license.
    SL_ASYNC_CONTEXT*   pAsyncContext
);
```

Parameters
hSLC
[in] Handle to current SL client context handle
pszProdKeyHash
[in] string of product key hash. The product key hash is created when SLInstall is called and is maintained by the licensing service.
pszPublishingLicense
[in] string of publishing license.
pAsyncContext
[in] asynchronous context for SL asynchronous call.
Remarks
The acquired license will be stored in license store accordingly and the license information will be registered, too. (see SLInstall)
Applications might need to add more client information to license. The application can put the information to pbAppData in the call and this data will be sent to clearing house.
When this function succeeds:
It sent necessary binding information to the specified license server.
It receives the license from license server.
It stored the license in license store. See description of SLInstall, above, for how the license file is stored.
Returns
Success or failure.

SLGenerateTextChallenge
Generates and installation challenge text to be routed to a license issuer in an out of band fashion (telephone, email, file share, etc).

```
HRESULT SLGenerateTextChallenge(
    HSLC     hSLC,            // SL client context handle
    PCWSTR   pszProdKeyHash,  // string of product key hash
    BOOL     fSingleSession,  // Single session only?
    PWSTR    *ppszChallenge   // Pointer to buffer to hold
                              challenge text
);
```

Parameters
hSLC
[in] Handle to current SL client context handle
pszProdKeyHash
[in] String of product key hash. The product key hash is created when SLInstall is called and maintained by the licensing service.
bSingleSession
[in] Specifies whether or not the corresponding text response from the license issue will be valid only for the lifetime of this SLC session handle.
ppszChallenge
[out] If successful, the text challenge is returned in the buffer allocated by SLC. The caller needs to call SLFreeMemory to free the allocated memory.
Returns
Success or failure.
SLDepositTextResponse
Deposits the response to an installation challenge text in the licensing system. Used to activate a license with a conditional access code. Only valid if there is an outstanding text challenge which has been issued for a license. If the original license specified that the challenge was only valid for a single session, this API must be called with the response before the SLC handle is closed or depositing the response will fail.

```
HRESULT SLDepositTextResponse(
    HSLC     hSLC,            // SL client context handle
    PCWSTR   pszProdKeyHash,
    PWSTR    pszResponse      // Buffer containing response text
);
```

Parameters
hSLC
[in] Handle to current SL client context handle
pszProdKeyHash
string of the product key hash
pszChallenge
[in] Response text
Returns
Success or failure.
SLEnumLicense
The SLEnumLicensefunction is used to enumerate installed licenses and get information from the license.

```
HRESULT SLEnumLicense(
    HSLC          hSLC,       // SL client context handle
    CONST GUID*   pguidApp,   // application GUID
    DWORD         dwIndex     // index number
);
```

Parameters hSLC

[in] Handle to current SL client context handle pguidApp

[in] See SLInstall. IfpguidApp is not NULL, then licenses associated with this GUID are enumerated. If the GUID is NULL, then all licenses are enumerated.

dwindex

[in] The index number of the license to be retrieved. This value should be zero for the first call to the SLEnumLicense function and then incremented for subsequent calls.

The function may return licenses in any order.

Returns

E_SL_NO_MORE_DATA—No license at the specified index.

Remarks

If SLEnumLicenses succeeded, the selected license information can be accessed by calling SLGetInformation and the category is SL_CAT_ENUMLICINFO Sample:

```
DWORD i=0;
PBYTE pbProductPriority = NULL;
PBYTE pbRemainingGracePeriodDays = NULL;
for (i=0; ; i++)
{
    EXIT_ON_ERROR(SLEnumLicense(hSLC, NULL, dwIndex));
    if (E_SL_NO_MORE_DATA == SCODE(hr))
    {
        hr = S_OK;
        break;
    }
    EXIT_ON_ERROR(SLGetInformation(hSLC,
SL_CAT_ENUMLIC, "ProductPriority", &dwType, &cbProductPriority,
&pbProductPriority));
    EXIT_ON_ERROR(SLGetInformation(hSLC,
SL_CAT_ENUMLIC, "RemainingGracePeriodDays", &dwType,
&cbRemainingGracePeriodDays, &pbRemainingGracePeriodDays));
    Exit:
        SLFreeMemory(pbProductPriority);
        SLFreeMemory(pbRemainingGracePeriodDays);
}
```

SLFreeMemory

The SLFreeMemory function is used to free the memory allocated by SLC.

```
VOID SLFreeMemory(
    PVOID       pvMemblock,      // pointer to memory
);
```

Parameters pvMemBlock

[in] Previously allocated memory block to be freed

Returns

None

Use of Software Licensing API to Control Use of Software

A software product uses the API of the present invention for various purposes related to licensing, including the consumption of rights in a license, and the retrieval of data from the license. As noted above, the API allows the software to determine what rights are present in the license, but, preferably, it is up to the software to determine what to do with that information—e.g., grant or deny access to a feature, cease operation altogether, etc. The following description of FIGS. 4 and 5 show how the API of the present invention is used by a software product.

Figure 4:
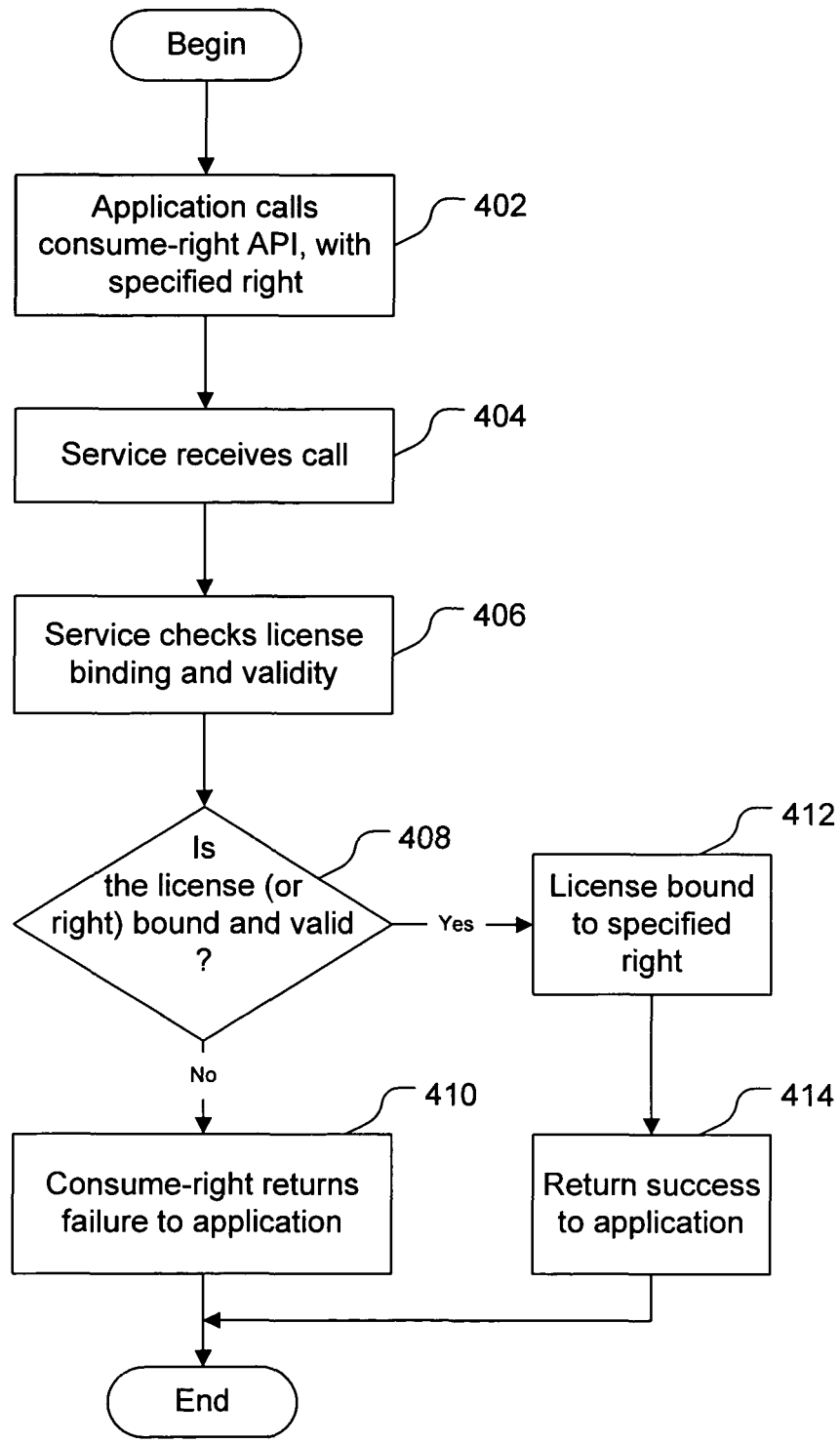
FIG. 4 is a flow diagram of a method by which a software product consumes a right.
Figure 5:
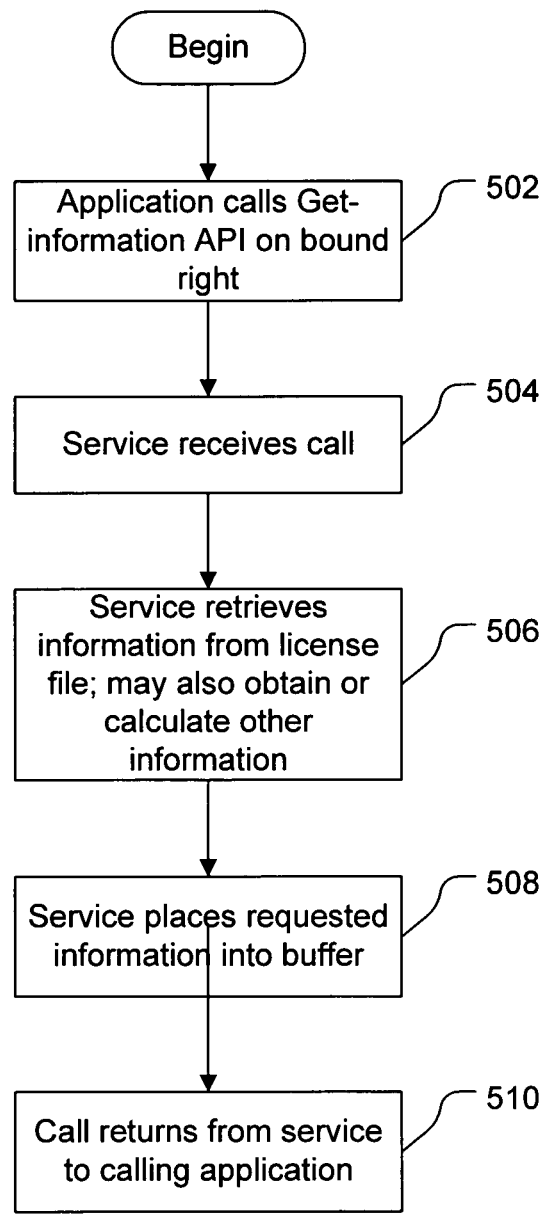
FIG. 5 is a flow diagram of a method by which a software product retrieves information relating to a consumed right.

FIG. 4 shows an example process by which an application "consumes" a right. The application calls the SLConsumeRight method (402). As discussed above, the arguments to the SLConsumeRight function include the client handle assigned by the licensing service, and the name of the right (which is assigned by the vendor of the software to which the right pertains). The licensing service (service 202, shown in FIG. 2) receives the call (404). The service then locates licenses that contains the right, and checks the licenses bindings and validity. As noted above, the license is located in the license store; if there is more than one license that pertains to the application software to which the SLConsumeRight call pertains, then a priority rule may be used to select one of the applicable licenses. Checking the binding means determining that: (1) the license is bound to the product key of the application identified by the client handle; and (2) the license is bound to the machine on which the software is running (or to the group or class of machines of which the current machine is a member). Checking validity may include determining that the right has not expired (in the case of licenses that specify an expiration date), and that the maximum number of uses of the right is not exceeded (in the case where the license specifies a maximum number of times that the right may be used (i.e., "consumed")).

If the license and/or right are found to be correctly bound and valid (408), then the license is bound to the right requested in the API call (412). (It should be noted that "binding" a license to a machine, environment, and a product key means that the license specifies which machine(s) and product key it can be used with; "binding" a license to a right means that the consume function has been successful, and the right is being consumed from a particular license. Throughout this description, it will be clear from context which meaning of "binding" applies.) The API call then returns to the calling application and indicates that the call was successful (414). If the license and/or right has been found to be invalid, or not correctly bound to the machine, environment, or product ID, then the SLConsumeRight call returns to the calling application and indicates that the operation failed (410).

If the SLConsumeRight call returns with a failure, then the right specified in the call cannot be consumed from a license, and no information about that right will be available to the calling application. However, if the right is successfully consumed, then the application can use the binding of the right to the license to get information from the license about the right. For example, a license may contain a general right called "run," which indicates that the application may be run. However, for the "run" right, the license may contain more specific parameters about the usage of the application—e.g., the license may specify whether particular features of an application (e.g., print, edit, save, etc.) should be turned on or off, and may give specific parameters for the use of these features (e.g., the document can be saved only on machines that are running in a particular domain, or the print feature can only be used for thirty days, etc.). The SL API does not require any particular type of information to be associated with a right, but rather provides a mechanism whereby an application vendor can associate any type of information with a right, which can then be retrieved and interpreted by the application.

Assuming that a right has been successfully consumed as described in FIG. 4, the application may then retrieve the information associated with the right. The process of retrieving this information is described in FIG. 5.

First, the application calls the SLGetInformation method on the bound right (502). The various types of information that can be retrieved are described above in connection with the description of the SLGetInformation method. The licensing service then receives the call (504). The service retrieves the requested information from the license file that contains the bound right (506). The licensing service then places this information in a buffer (508), and returns to the calling application (510). The calling application then reads the contents of the buffer, and performs whatever actions it deems necessary based on the retrieved information.

It should be noted that the licensing service may not be aware of the meaning of the information that it is handling as part of an SLGetInformation call. As discussed above, the licensing framework provides a mechanism whereby a software vendor can create rights, and can associate information with the rights. The invention is not limited either to any particular type of information that can be associated with the right. When the information is retrieved from the license, it is simply passed by the licensing service to the application in a buffer. The application then interprets the retrieved information, decides what actions to be taken based on that information, and uses its own security features to enforce the application's decision. (E.g., if, based on the retrieved information, the application decides to disable the print feature, the application contains the code that actually disables this features and, possibly, code that prevents a hacker from tampering with the disabling of the print feature.)

It is noted that the foregoing examples have been provided merely for the purpose of explanation and are in no way to be construed as limiting of the present invention. While the invention has been described with reference to various embodiments, it is understood that the words which have been used herein are words of description and illustration, rather than words of limitations. Further, although the invention has been described herein with reference to particular means, materials and embodiments, the invention is not intended to be limited to the particulars disclosed herein; rather, the invention extends to all functionally equivalent structures, methods and uses, such as are within the scope of the appended claims. Those skilled in the art, having the benefit of the teachings of this specification, may effect numerous modifications thereto and changes may be made without departing from the scope and spirit of the invention in its aspects.

What is claimed:

1. An apparatus comprising:
   at least one computer processor;
   a license store that stores license files for different software products, said license files including licenses to the different software products specifying rights and conditions on the exercise of said rights; and
   memory coupled to the at least one computer processor, the memory comprising executable instructions that, based on execution by the at least one computer processor, cause the at least one computer processor to automatically:
      expose an application programming interface that provides access by application programs to license information associated with the different software products in said license files in said license store;
      receive from an application program via said application programming interface a request comprising an indication of a software product and a request to exercise a right granted in a license to the software product in said license files;
      check whether the license for the indicated software product is valid;
      based at least on the license for the indicated software product being valid, obtaining from said license store rights and conditions of the exercise of said rights granted in the license for the software product indicated in the request; and
      provide, based at least on receiving the request via said application programming interface, the rights and conditions of the exercise of said rights granted in the license for the software product indicated in the request to the application program without implementing any mechanism for granting or denying the rights granted in the license for the software product, wherein the instructions for checking whether the license for the indicated software product is valid further comprises instructions for determining that the license for the indicated software product is bound to the software product by determining whether the rights granted in the license for the software product indicated in the request can be exercised based on whether the rights are bound to a machine executing the application program from which the request was received, wherein the instructions further comprise instructions for establishing a context for asynchronous processing and processing the request from the application program, asynchronously, in accordance with the established context, and wherein the executable instructions are executed by an operating system.

2. The apparatus of claim 1, further comprising a trust store that stores data used in a license validation process in a tamper-resistant manner.

3. The apparatus of claim 1, wherein the instructions for checking that the license for the indicated software product is valid includes instructions for determining, via a conflict rule, which license to obtain from a plurality of licenses indicated by said license files that are stored in the license store for the software product, the plurality of licenses including the license to the software product.

4. The apparatus of claim 1, wherein the rights and conditions of the exercise of said rights granted in the license for the software product indicated in the request comprise an indication of a validity of the rights granted in the license for the software product.

5. A method comprising:
   exposing an application programming interface that provides access by application programs to license information in a license store storing license files for different software products, said license files including licenses to the different software products specifying rights and conditions on the exercise of said rights;
   receiving from an application program via said application programming interface a request comprising an indication of a software product having a license file in the license store and a request to exercise a right granted in a license to the software product in said license files;
   checking whether the license for the indicated software product is valid;
   based at least on the license for the indicated software product being valid, obtaining from said license store rights and conditions of the exercise of said rights granted in the license for the software product indicated in the request;
   providing, based at least on receiving the request via said application programming interface, the rights and conditions of the exercise of said rights granted in the license for the software product indicated in the request to the application program without implementing any mechanism for granting or denying the rights granted in the license for the software product, wherein checking whether the license for the indicated software product is valid further comprises determining that the license for the indicated software product is bound to the software product by determining whether the rights granted in the license for the software product indicated in the request can be exercised based on whether the rights are bound to a machine executing the application program from which the request was received;

establishing a context for asynchronous processing; and processing the request from the application program, asynchronously, in accordance with the established context, wherein the method is executed by an operating system.

6. The method of claim 5, further comprising storing data used in a license validation process in a trust store in tamper-resistant manner.

7. The method of claim 5, wherein checking that the license for the indicated software product is valid includes determining, via a conflict rule, which license to obtain from a plurality of licenses in said license files that are stored in the license store for the software product, the plurality of licenses including the license to the software product.

8. The method of claim 5, wherein the rights and conditions of the exercise of said rights granted in the license for the software product indicated in the request comprise an indication of a validity of the rights granted in the license for the software product.

9. A computer-readable memory device comprising executable instructions that, based on execution by at least one computer processor, cause the at least one computer processor to:

expose an application programming interface that allows application programs to request license information contained in a license store storing license files for different software products, said license files including licenses to the different software products specifying at least one right;

receive from an application program at least via said application programming interface a request comprising an indication of a software product having a license file in the license store and a request to exercise a right granted in a license to the software product in said license files;

check whether the license for the indicated software product is valid;

based at least on the license for the indicated software product being valid, obtain from said license store the at least one right granted in the license for the software product indicated in the request;

provide, based at least on receiving the request via said application programming interface, the at least one right granted in the license for the software product indicated in the request to the application program without implementing any mechanism for granting or denying the rights granted in the license for the software product, wherein checking whether the license for the indicated software product is valid further comprises determining that the license for the indicated software product is bound to the software product by determining whether the rights granted in the license for the software product indicated in the request can be exercised based on whether the rights are bound to a machine executing the application program from which the request was received;

establishing a context for asynchronous processing; and processing the request from the application program, asynchronously, in accordance with the established context, wherein the instructions are executed by an operating system.

10. The memory device of claim 9, further comprising instructions for storing data used in a license validation process in a trust store in tamper-resistant manner.

11. The memory device of claim 9, wherein instructions for checking that the license for the indicated software product is valid includes instructions for determining, via a conflict rule, which license to obtain from a plurality of licenses in said license files that are stored in the license store for the software product, the plurality of licenses including the license to the software product.

12. The memory device of claim 9, wherein instructions to check whether the license for the indicated software product is valid comprises instructions that further cause the at least one processor to determine whether the rights granted in the license for the software product indicated in the request can be exercised based on whether rights are bound to a class of machines of which a machine executing the application program from which the request was received is a member.

13. The memory device of claim 9, wherein the license files further specify at least one condition on the exercise of said at least one right.

14. The memory device of claim 9, wherein the check further comprises checking whether the license for the indicated software product is bound to the software product.

15. The memory device of claim 9, wherein the obtaining the at least one right further comprises determining whether the license for the indicated software product is valid and bound to the software product, and obtaining the at least one right and conditions of the exercise of said at least one right granted in the license for the software product indicated in the request when the at least one right and conditions of the exercise of said at least one right granted in the license for the software product indicated in the request is valid and bound to the software product.

16. The memory device of claim 15, wherein providing the at least one right based at least on receiving the request, further comprises providing the at least one right and the conditions of the exercise of said at least one right granted in the license for the software product indicated in the request or the information from the license to the software product indicated in the request to the application software without implementing any mechanism for granting or denying the rights granted in the license for the software product.

* * * * *